Patented Sept. 14, 1948

2,449,162

UNITED STATES PATENT OFFICE 2,449,162

PROCESS FOR THE PRODUCTION OF CYCLIC LACTONES

Haydn Geoffrey Dickenson, Warrington, England, assignor to Ward, Blenkinsop & Company Limited, London, England, a British company No Drawing. Application February 8, 1947, Serial No. 727,311. In Great Britain February 7, 1946

Section 1, Public Law 690, August 8, 1946

5 Claims. (Cl. 260—344.6)

This invention relates to the production of cyclic lactones of the coumarin series.

Hitherto cyclic lactones of the coumarin series have been obtained by condensing o-acetoxybenzoyl chloride and its homologues with sodiomalonic ester (Anschütz et al., Annalen, volume 367, page 174) and decarboxylating the products by treatment with alkali. There are difficulties in carrying out this process however and the yields are not, in general, very good.

Heretofore little use has been made of dialkyl carbonates as reactants in the Claisen reaction. Wislicenus, Berichte der Deut. Chem. Gas., volume 20, page 2930 (1877) failed to condense ethyl carbonate with ethyl acetate. Subsequently Lux, ibid., volume 62, page 1824 (1929), obtained an 18% yield of diethyl malonate by adding ethyl acetate to a refluxing mixture of benzene, diethyl carbonate and powdered sodium. More recently Wallinford et al., J. Am. Chem. Soc., volume 63, page 2056 (1941), have shown that this type of reaction is reversible and that the yield can be increased if one of the reaction products is progressively removed from the reaction zone. In a subsequent paper these authors, ibid., page 2252, have examined the reaction between diethyl carbonate and a series of ketones in the presence of alkali metal alcoholates. Acetophenone and several p-substituted acetophenones have been shown to give varying yields of the corresponding benzoyl acetates whilst the homologous acylophenones have been shown to give the corresponding a-benzoyl esters. In order to obtain a maximum yield of the desired product these authors took steps to remove the liberated alcohol from the reaction mixture as it was formed.

It has now been found that the Claisen reaction between a carbonic ester and an o-hydroxy acylophenone can be utilized for the production of cyclic lactones of the coumarin series in good yield.

According to the present invention a process for the production of a derivative of a cyclic lactone of the coumarin series comprises condensing a dialkyl or diaralkyl carbonate with an o-hydroxy acylophenone of the general formula

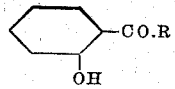

in which R is an alkyl group in the presence of an alkali metal alcoholate. In order to liberate the free cyclic lactone therefrom the resulting derivative is treated with acid.

According to a feature of the invention an excess of dialkyl or diaralkyl carbonate, based on the orthohydroxy aryl ketone, is employed.

According to a further feature of the invention the alkali metal alcoholate employed is a sodium or potassium alcoholate.

Whilst any dialkyl or diaralkyl carbonate may be employed it is generally preferred to employ diethyl carbonate.

It is considered that the reaction which takes place between the carbonic ester and the ketone of the said general formula involves the intermediate production in situ of an a-(ortho-hydroxybenzoyl) acyl ester or a derivative thereof which then undergoes cyclization to produce the corresponding coumarin derivative under the reaction conditions. Thus under Claisen reaction conditions the ester product appears to undergo further reaction, presumably forming a cyclized derivative, substantially as it is formed. The initial Claisen condensation is then no longer readily reversible. It is still desirable, although not essential, to remove the liberated alcohol since removal thereof prevents the lactone ring re-opening as well as minimizing hydrolysis of the carbonic ester and according to a further feature of the invention the condensation is carried out by heating the reactants in a solvent which is inert with respect thereto and which forms a low-boiling azeotrope with the alcohol liberated during the reaction.

The ketone or ester which constitutes a starting material in the process has a hydroxy group present in the ortho position in the benzene ring. Other substituents such as alkyl groups may also be present in the benzene ring so long as these do not interfere with the condensation and/or cyclization steps. The ketone reactant employed may be ortho-hydroxyacetophenone or an homologue thereof such as an ortho-hydroxy propio- or butyrophenone. When these reactants are employed under Claisen condensation conditions and the products are treated with aqueous acid, lactones are obtained which, in one tautomeric form may be described as 4-hydroxy-coumarins.

The reaction may be carried out by heating the carbonic ester and the o-hydroxyacylophenone with an alkli metal alcoholate, with or without a substantially anhydrous non-alcoholic solvent such as benzene, toluene or xylene. The alcoholate may first be produced in the reaction vessel from the corresponding metal, for example, sodium or potassium, and the alcohol, for example, ethyl, a propyl or a butyl alcohol, the excess alcohol removed and the reactants, with or without non-alcoholic solvent, added to the reaction vessel. The reaction mixture is preferably heated. The product may be separated by adding water, separating the non-aqueous layer and acidifying the residue.

The products are especially useful for condensing with aldehydes to form therapeutically valuable dihydroxy dicoumarins. Thus reaction with formaldehyde gives a 3.3'-methylene dis(4-hydroxycoumarin).

The following examples illustrate the manner in which the invention may be carried into effect. All the parts are by weight.

*Example 1*

1.7 parts of sodium metal were dissolved in 25 parts of dry ethyl alcohol and when completely dissolved, the excess alcohol removed by distillation, finally under reduced pressure.

To the dry sodium ethoxide thus produced was added 25 parts of diethyl carbonate followed by 5 parts of o-hydroxyacetophenone, the mixture being constantly stirred. The semi-solid mass was heated on the water-bath for 4 hours and then dissolved in 75 parts of water. The upper layer of unchanged diethyl carbonate was separated, and the aqueous layer acidified with hydrochloric acid using Congo Red as indicator. The precipitated 4-hydroxy-coumarin was removed by filtration and purified by crystallisation from water or dilute alcohol. M. Pt. 209–10°.

*Example 2*

The condensation of Example 1 was repeated using instead of o-hydroxy acetophenone, a corresponding molar amount of o-hydroxy propiophenone. The product was 3-methyl-4-hydroxycoumarin. M. Pt. 226–8° C.

*Example 3*

1.7 parts of sodium metal was dissolved in 25 parts of dry ethanol and the solution evaporated to dryness in vacuo. To the dry sodium ethylate so obtained was added 35 parts of dry benzene, 5 parts of o-hydroxyacetophenone and 7 parts of diethyl carbonate. The mixture was then heated under a short fractionating column so that the azeotrope of benzene with the ethyl alcohol formed in the condensation distilled from the reaction mixture. When 20 parts of benzene had been collected, a further 35 parts of dry benzene was added to the distilling reaction mixture and distillation resumed. After a total of four hours heating the residual benzene was removed under reduced pressure and the reaction mass worked up as in Example 1. 4-hydroxycoumarin was isolated as before. M. Pt. 209–10° C.

What I claim is:

1. A process for the production of a coumarin which comprises treating an ortho-hydroxy acylophenone, having the general formula

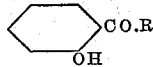

in which R is a lower alkyl group with a carbonate having the general formula $CO.(OR^1)_2$ in which $R^1$ is selected from alkyl and aralkyl groups in the presence of an alkali metal alcoholate and treating the product with acid to liberate said coumarin.

2. A process for the production of a coumarin which comprises heating an ortho-hydroxy acylophenone, having the general formula

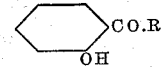

in which R is a lower alkyl group with a lower dialkyl carbonate in the presence of an alkali metal alcoholate and treating the product with mineral acid to liberate said coumarin.

3. A process for the production of 4-hydroxycoumarin which comprises heating ortho-hydroxyacetophenone with diethyl carbonate and a solvent which forms a low boiling azeotrope with ethyl alcohol, in the presence of an alkali metal alcoholate, distilling from the reaction mixture the azeotrope produced and treating the product with mineral acid to liberate said coumarin.

4. A process for the production of 3-methyl-4-hydroxycoumarin which comprises heating ortho-hydroxypropiophenone with diethyl carbonate in the presence of an alkali metal alcoholate and treating the product with mineral acid to liberate said coumarin.

5. A process for the production of 4-hydroxycoumarin which comprises heating ortho-hydroxyacetophenone with an excess of diethyl carbonate and a solvent which forms a low-boiling azeotrope with ethyl alcohol in the presence of an alkali metal alcoholate, distilling from the reaction mixture the azeotrope produced, removing the remainder of said solvent and treating the residue with mineral acid to liberate said coumarin.

HAYDN GEOFFREY DICKENSON.

REFERENCES CITED

The following references are of record in the file of this patent:

Wallingford et al., J. Am. Chem. Soc. 63, 2252 (1941). (Copy in Sci. Lib.)

Gilman, Organic Chem., vol I, pages 1040–1041, 2nd ed., J. Wiley & Sons.

Smith et al., J. of Organic Chem. 4, 358–362 (1939).